Figure 5:
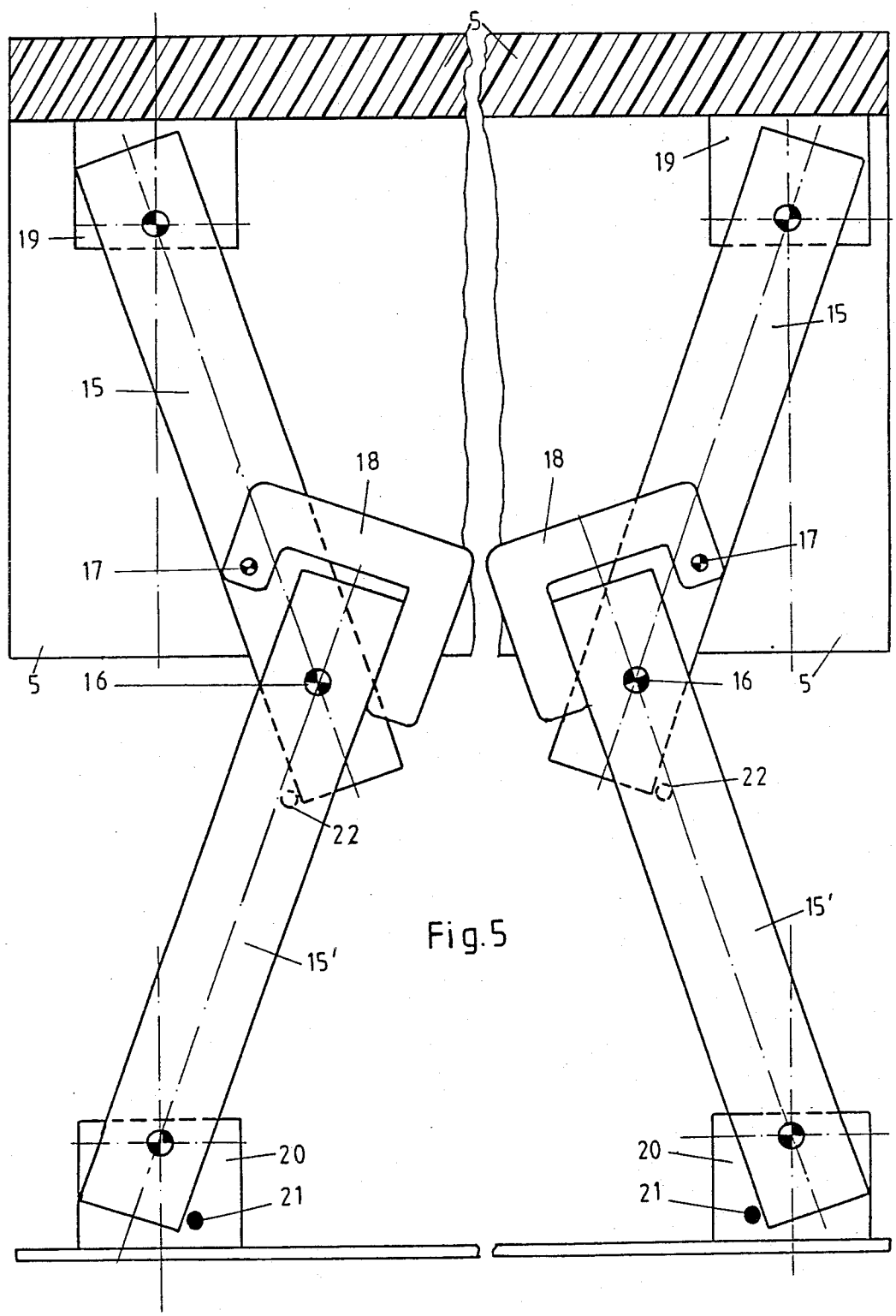

United States Patent [19]

Sollich

[11] Patent Number: 4,532,857
[45] Date of Patent: Aug. 6, 1985

[54] TUNNEL FOR REFRIGERATING, HEATING, OR DRYING PRODUCTS OF THE FOODSTUFFS AND ESPECIALLY THE CONFECTIONERY INDUSTRY

[76] Inventor: Helmut Sollich, Karschau 54, D - 2341 Rabenkirchen, Fed. Rep. of Germany

[21] Appl. No.: 564,092

[22] Filed: Dec. 21, 1983

[30] Foreign Application Priority Data

Dec. 7, 1983 [EP] European Pat. Off. ........ 83112287.4

[51] Int. Cl.³ .............................................. A23L 3/00
[52] U.S. Cl. ........................................ 99/483; 34/201; 34/236; 62/374; 62/380; 99/443 C; 99/467
[58] Field of Search ................. 99/483, 467, 516, 517, 99/443 R, 474, 443 C, 482, 477, 386; 432/128, 152, 158, 153; 126/19 R, 21 R; 219/400, 388; 34/201, 236; 62/380, 374

[56] References Cited

U.S. PATENT DOCUMENTS 3,695,170 10/1972 Ehrenberg ......................... 99/443 C
3,910,176 10/1975 Burrows .................................. 99/477
4,008,996 2/1977 Wells ..................................... 432/128
4,245,613 1/1981 Wells et al. ........................ 99/443 C
4,366,177 12/1982 Wells et al. ........................ 126/21 R
4,448,117 5/1984 Wells .................................. 99/443 C Primary Examiner—Timothy F. Simone
Attorney, Agent, or Firm—Max Fogiel

[57] ABSTRACT

A tunnel for refrigerating, heating, or drying products of the foodstuffs and especially the confectionery industry. The hoods that constitute the tunnel are connected to its base by spreaders and can be lifted off it independently of one another to above the conveyer belt.

11 Claims, 6 Drawing Figures

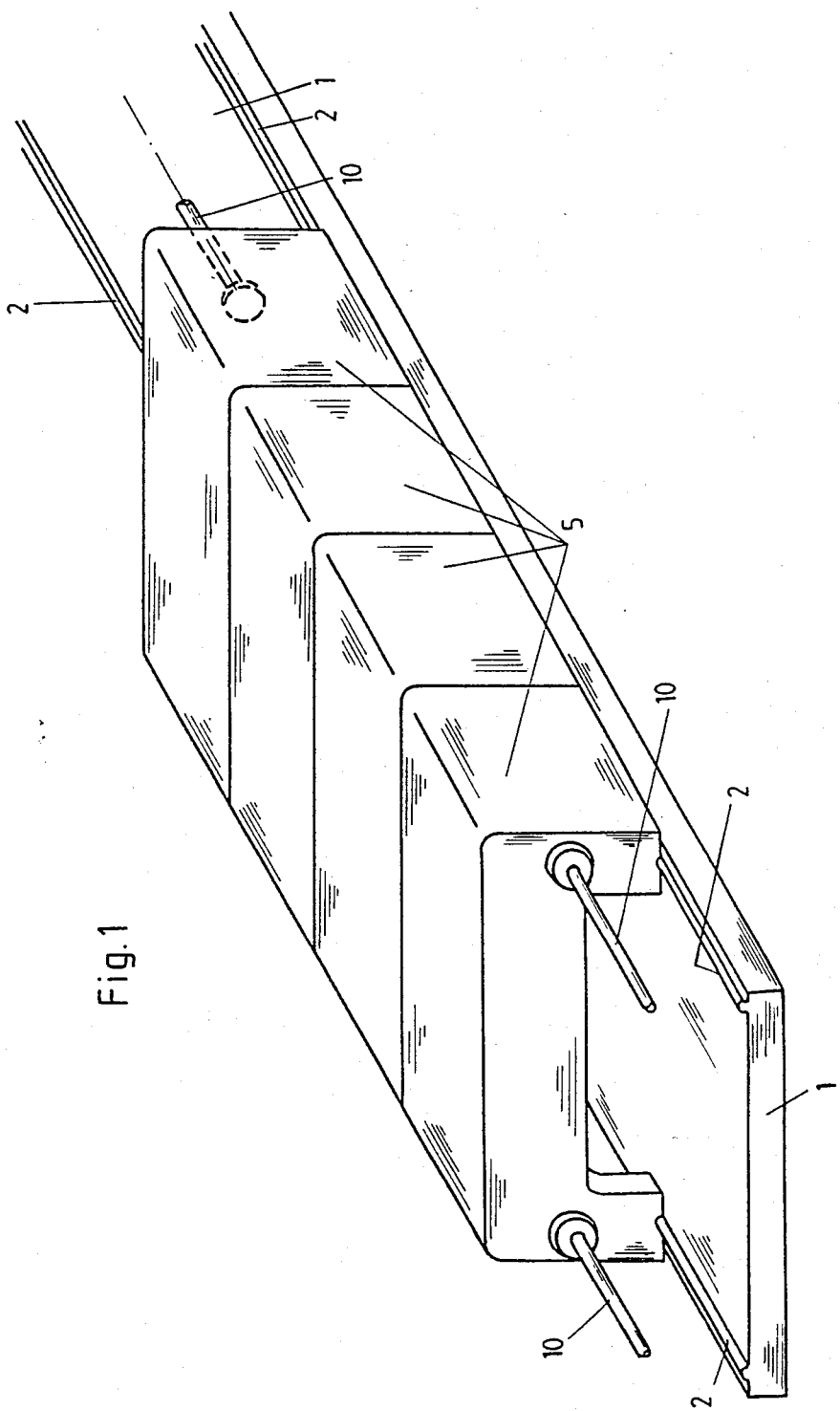

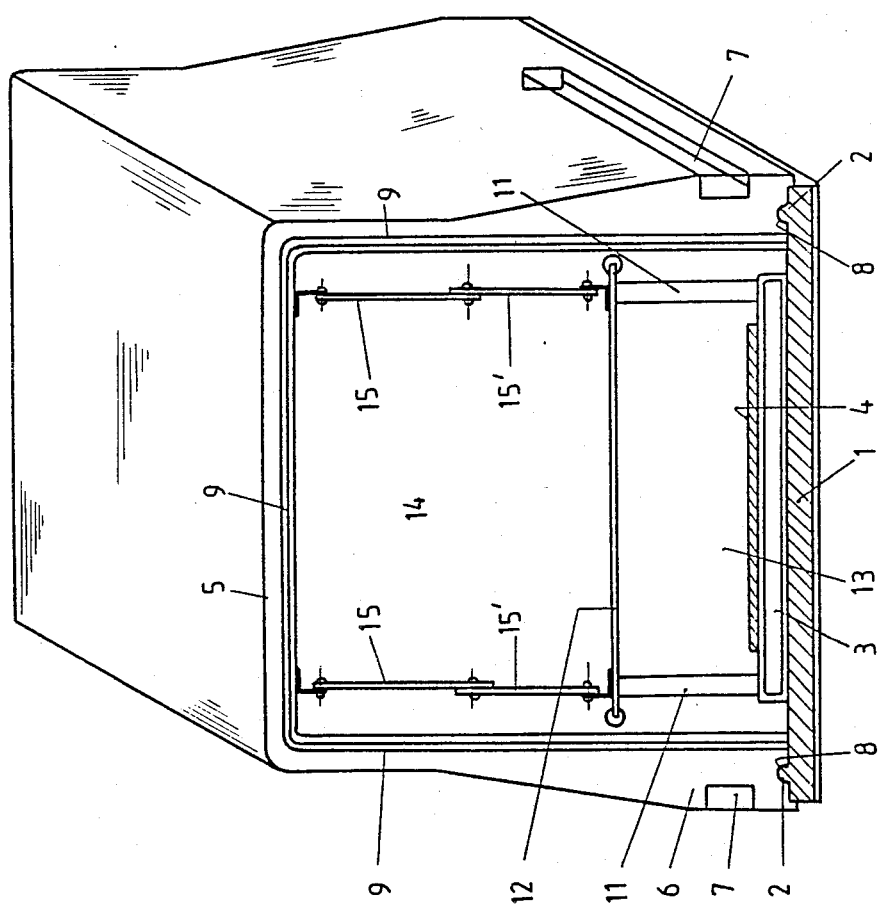

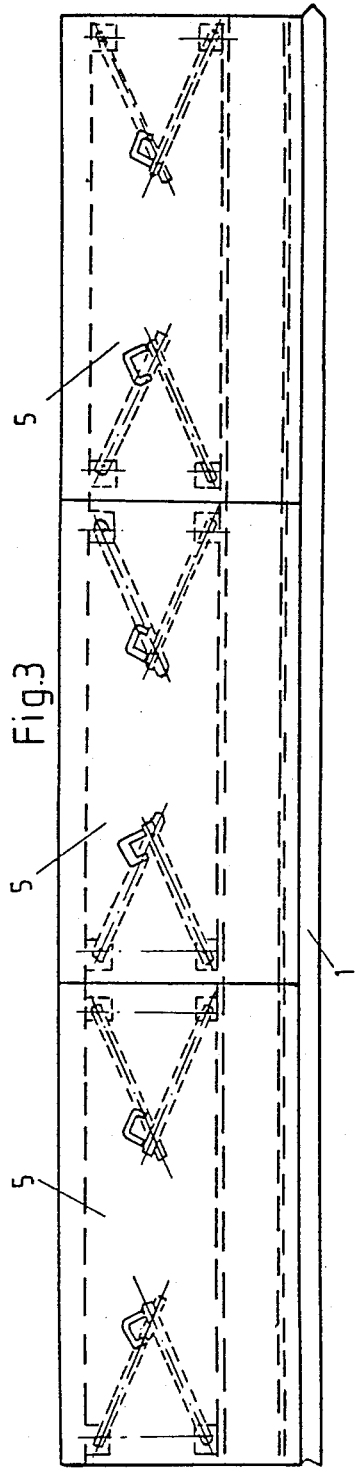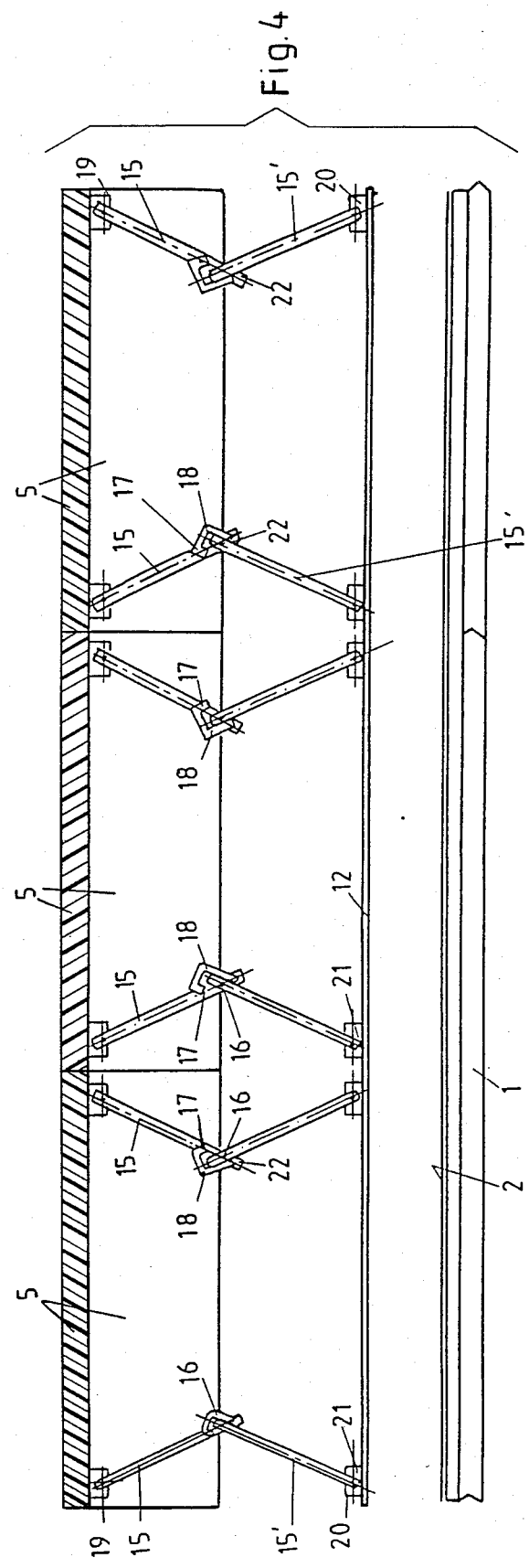

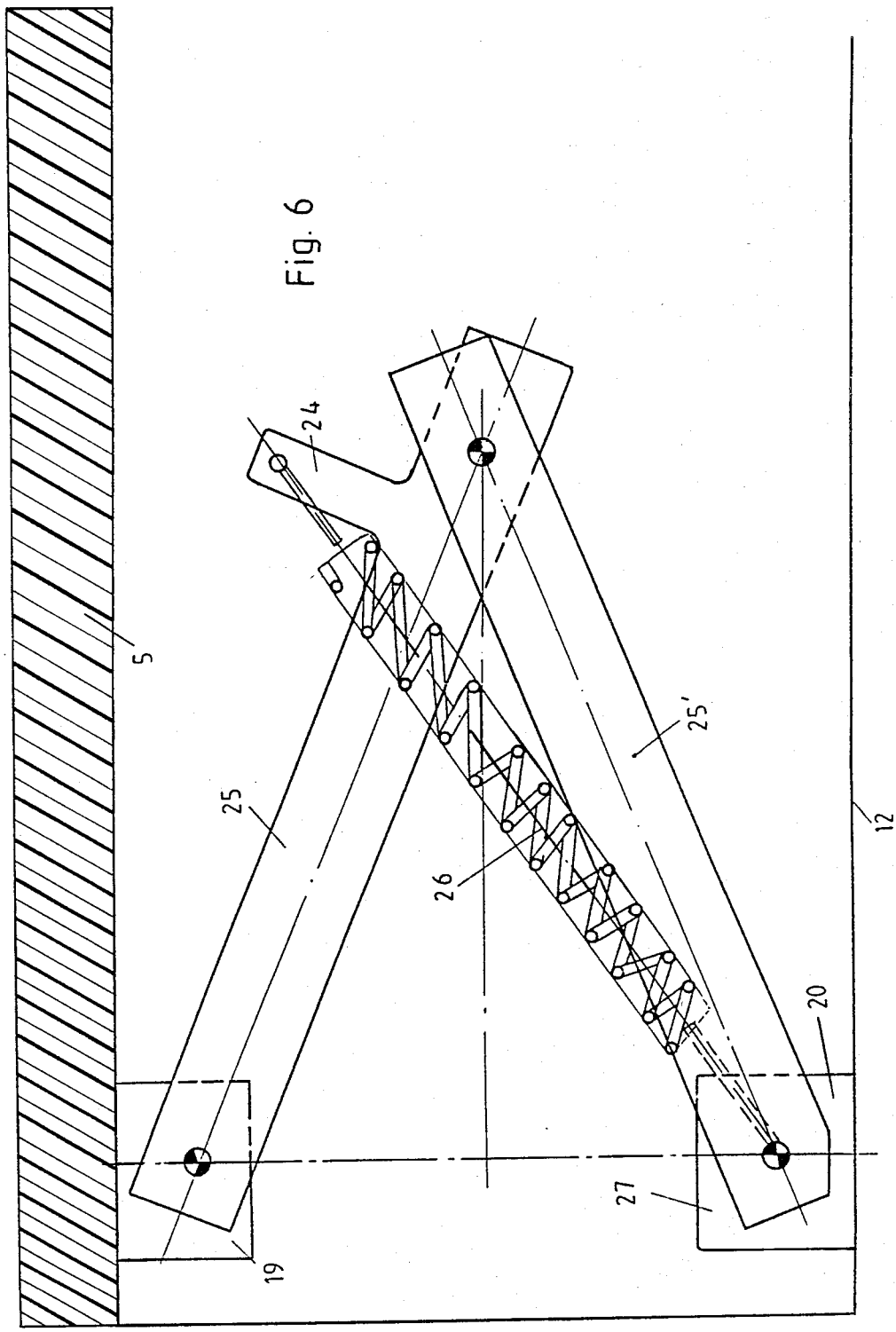

TUNNEL FOR REFRIGERATING, HEATING, OR DRYING PRODUCTS OF THE FOODSTUFFS AND ESPECIALLY THE CONFECTIONERY INDUSTRY

The invention concerns a tunnel for refrigerating, heating, or drying products of the foodstuffs and especially the confectionery industry. Pieces of the widest range of products are exposed to a current of cold or hot air in tunnels of this type on a conveyer belt traveling through the tunnel in order to process or alter them at a particular stage. Constructing the tunnels employed in such processing out of a series of any desired number of adjacent hoods is known. It is necessary to remove the individual hoods in order to clean the system. They can be lifted off of the base of the tunnel and set down in a clear space. This involves problems in relation to the weight of the hoods, however, when they are large or when the belt is wide. Furthermore, the edges of the hoods can get contaminated or even damaged when they are set down. Lifting individual hoods away from the tunnel and sliding the remaining hoods into the resulting gap in order to expose the conveyer belt bit by bit is accordingly also known. This procedure, however, also involves problems and, in particular, is very time-consuming. Finally, systems in which the individual hoods are pivoted up and to the side on one corner or in which the tunnel contains supporting points at which hood components can be pivoted up on hinges or articulated joints are also known. Measures of this type complicate the overall design of the system and make it more expensive, however, and entail in particular the drawback of gaps between the mating surfaces of the hood components articulated to the supporting points. The gaps are difficult to seal and lead, as experience has demonstrated, to a loss of coolant or hot air. What is common to all known embodiments, however, is that cleaning and maintenance are always extraordinarily difficult and time-consuming when the belt is wide.

The object of the invention is to eliminate all the aforesaid drawbacks of known tunnel embodiments and to create a tunnel with hoods that can be removed simply and with very little effort without contaminating or damaging them while providing sufficient space for convenient and thorough cleaning.

This object is attained in accordance with the invention in that the hoods that constitute the tunnel are connected to its base by spreaders and can be lifted off it independently of one another to above the conveyer belt. This results in easy and simple handling of the hoods because they consist of rigid pieces of hard plastic, polyurethane or a similar material for example, with a U-shaped cross-section and a hard skin. Furthermore, each spreader consists of a toggle-lever mechanism and has locks, snaps, catches, or similar structures to retain the hoods in the elevated and/or lowered position. The hoods preferably rest with their lower edges on the base of the tunnel in a tongue-and-groove guide that they can slide along. The spreaders move freely enough to allow the hoods to be tensioned longitudinally. The spreaders can on the other hand have a spring that forces them into their particular terminal position and that also forces the hoods against the base of the tunnel or secures them in their elevated position.

The tightness of the tunnel is ensured in that the front contact surfaces of the hoods have elastic seals and in that there is a tensioning device that holds the series of adjacent hoods together parallel to the length of the tunnel.

The advantages of the tunnel in accordance with the invention derive from its simple design and simplified and easy maintenance. The total area that requires cleaning can be exposed by lifting the hoods vertically. There are no resulting sealing problems. Since the tunnel is absolutely tight when closed, temperature oscillations and losses of air can be extensively excluded. The supplementary framework that has previously been necessary to set the hoods on when they were removed can be completely eliminated. The individual hoods can be lifted as desired with very little effort.

The theory behind the invention allows a very wide range of embodiments. One of them is illustrated in the attached drawings, in which FIG. 1 is a perspective view of a tunnel, minus the conveyer, for refrigerating, heating, or drying a very wide range of products, FIG. 2 is a transverse section in a different scale through the tunnel, FIG. 3 is a side view of the tunnel with the hoods in place, FIG. 4 is a longitudinal section through the tunnel, and FIGS. 5 and 6 are different larger-scale illustrations of the spreader mechanism.

A cooling plate 3, for example, over which a conveyer belt 4, a mesh belt for example, travels, rests on a flat tunnel base 1 of appropriate length and with a slide tongue 2 extending along it on each side.

A series of adjacent hoods 5 are positioned in close contact on base 1. Each hood 5 has a U-shaped cross-section and its side walls 6 are thick enough to provide for grab troughs 7 on the outside to facilitate lifting it off of base 1. Troughs 7 do not, however, penetrate to inside the hood. There is a longitudinal groove 8 that conforms to the shape of slide tongue 2 in the bottom contact surface of each side of hood 5. Slide tongue 2 and groove 8 allow the hoods 5 to slide along base 1. A seal is inlayed into the front contact surface of each hood 5 to seal the gap between each pair of hoods as they are slid together.

The hoods are essentially rigid and consist as aforesaid of a U-shaped solid body of foam, polyurethane for example, that is covered with a hard skin on all sides. The resulting hood, although relatively light in weight, is very strong and can resist all the mechanical stresses that may occur in the course of operation.

An intermediate floor 12 rests at a certain distance off base 1 on supports 11 inside the tunnel and vertically demarcates a product channel 13 above conveyer belt 4. Spreaders that consist in the embodiment illustrated in FIG. 4 of a pair of toggle levers 15 and 15' are positioned close to the inside surface of the hoods at each wall in an aeration space 14 above intermediate floor 12. Toggle levers 15 and 15' are articulated together by pivot 16. A catch 18 that pivots around a pin 17 is mounted in the vicinity of each articulation. As illustrated in FIG. 4, each catch 18 pivots off over the head of lever 15' when its particular hood 5 is lifted high enough. Two pairs of toggle levers 15 and 15', four for each hood 5, that is, are positioned at each inside surface of each hood to ensure uniform elevation of the hoods. Levers 15 are mounted in bearings 19 in the inside surface of the wall of a hood 5 and levers 15' in pillow blocks 20 that also have stops 21 or similar structures that limit the deflection of the levers. Levers 15 can also have corresponding stops 22. Catches 18 can easily be pivoted up around pins 17 to lower a hood 5 so that each pair of toggle levers 15 and 15' can move back out of the extended position illustrated in FIGS. 4 and 5 into the folded position illustrated in FIG. 3.

It is essential to the invention that hoods 5 have a certain freedom of motion along the tunnel as a result of the design of the pairs of toggle levers as the latter fold together so that a tensioning device 10 can force the hoods tightly together longitudinally and so that an individual hood can be slid far enough away from the others before being lifted to be lifted off base 1 independently of the others without destroying the seal.

Finally, FIG. 6 illustrates another embodiment of the toggle-lever mechanism in which, although toggel levers 25 and 25' are articulated together as previously described herein, one lever 25 has a projecting holder 24 to which a tension spring 26 that engages a bearing 27 is fastened. The design of the lever mechanism in this case allows toggle-levers 25 and 25' to travel out to a certain extent when hoods 5 are lifted, with each tension spring 26 arriving at the other side of a lever 25' and retaining and securing levers 25 and 25' in the extended position, which corresponds to the elevated position of the hood.

The invention is naturally not to be construed as limited to one specific embodiment of the spreader. Spreaders based on the principle of the pantograph, for example, could also be employed.

I claim:

1. Tunnel for refrigerating, heating, or drying products of foodstuffs and particularly the confectionery industry; comprising a plurality of hoods arranged in series along the length of the tunnel; base means for supporting said hoods, said hoods being arranged in substantially close contact on said base means; spreader means for lifting said hoods off said base means; conveyor belt means within said tunnel; said spreader means connecting said hoods to said base means; each hood being liftable off said base means and above said conveyor belt means independent of the other hoods.

2. Tunnel as defined in claim 1, wherein said hoods comprise rigid pieces of hard plastic with a U-shaped cross-section and a hard skin.

3. Tunnel as defined in claim 1, wherein said spreader means comprises toggle-lever means.

4. Tunnel as defined in claim 1, wherein said spreader means has locking means to retain said hoods in an elevated or lowered position.

5. Tunnel as defined in claim 1, wherein said base means has tongue-and-groove guide means, said hoods having lower edges resting on said base means in said tongue-and-groove guide means.

6. Tunnel as defined in claim 5, wherein said hoods can slide along said tongue-and-groove guide means.

7. Tunnel as defined in claim 1, wherein said spreader means move freely to allow said hoods to be tensioned longitudinally.

8. Tunnel as defined in claim 1, including spring means for forcing said spreader means into a predetermined terminal position.

9. Tunnel as defined in claim 1, including elastic seal means at front contact surfaces of said hoods.

10. Tunnel as defined in claim 1, including tensioning means holding said series of adjacent hoods together parallel to the length of said tunnel.

11. Tunnel for refrigerating, heating, or drying products of foodstuffs and particularly the confectionery industry; comprising a plurality of hoods arranged in series along the length of the tunnel; base means for supporting said hoods, said hoods being arranged in substantially close contact on said base means; spreader means for lifting said hoods off said base means; conveyor belt means within said tunnel; said spreader means connecting said hoods to said base means; each hood being liftable off said base means and above said conveyor belt means independent of the other hoods; said hoods comprising rigid pieces of hard plastic with a U-shaped cross section and a hard skin; said spreader means comprising toggle-lever means; said spreader means having locking means to retain said hoods in an elevated or lowered position; said base means having tongue-and-groove guide means, said hoods having lower edges resting on said base means in said tongue-and-groove guide means; said hoods being slidable along said tongue-and-groove guide means; said spreader means moving freely to allow said hoods to be tensioned longitudinally; spring means for forcing said spreader means into a predetermined terminal position; elastic seal means at front contact surfaces of said hoods; tensioning means holding said series of adjacent hoods together parallel to the length of said tunnel.

* * * * *